United States Patent Office 2,945,858
Patented July 19, 1960

---

2,945,858

PRODUCTION OF PYRAZINES

Stanley D. Tarailo, Windsor, Ontario, Canada, assignor to Wyandotte Chemicals Corporation, Wyandotte, Mich., a corporation of Michigan No Drawing. Filed June 22, 1959, Ser. No. 821,660

8 Claims. (Cl. 260—250)

---

This invention relates to the production of pyrazines. In a more specific aspect, this invention relates to an improved method for producing pyrazines by dehydrogenating the corresponding piperazine compounds.

The production of pyrazine compounds by dehydrogenating piperazine compounds is an established art. The dehydrogenation reaction is carried out in vapor phase over a dehydrogenation catalyst such as copper, nickel, zinc oxide or cadmium oxide employed separately or together with one another or with chromium oxide, $Cr_2O_3$. Such a process is disclosed in British Patent No. 609,924, the U.S. patent to Dixon, U.S. 2,400,398, and the U.S. patent to Pfann, U.S. 2,414,552. These prior patents disclose that a copper chromite dehydrogenation catalyst is effective in the process and disclose that the reaction is carried out in vapor phase at from 300–500° C. and at atmospheric pressure. Little or nothing is disclosed in these prior patents about the production rate that is obtained or the catalyst life when using this process on a practical, commercial scale.

It is well known that in catalytic reactions, such as the catalytic dehydrogenation of a piperazine to a pyrazine, the catalyst exhibits a drop in activity during the use of the catalyst on a continuous basis. Since the catalyst is one of the main cost items in a continuous catalytic process, an important objective in improving such a process is to increase the amount of product obtained per unit of time per unit of catalyst employed. The dehydrogenation of piperazine compounds in vapor phase over copper chromite catalyst to produce the corresponding pyrazine compounds presents just this problem. The copper chromite catalyst is a main expense item and its activity gradually falls off until the economics of the system require that the use of the catalyst be suspended while it is regenerated. This cycle of catalytic activity, regeneration and catalytic activity cannot be avoided with copper chromite but its adverse effect on the cost of any process using a copper chromite catalyst can be minimized if the production rate per unit of catalyst can be increased.

An object of this invention, therefore, is to provide a new and improved process for producing pyrazines.

A further object is to provide a process for dehydrogenating a piperazine compound to the corresponding pyrazine compound employing a copper chromite catalyst wherein the effect of the cost of the catalyst is minimized.

A still further object is to provide a process for producing pyrazines in which the weight of pyrazine compound produced per unit weight of catalyst per unit of time is increased over that obtainable when following the teachings of the prior art.

These objectives have been accomplished by the method of the invention wherein a piperazine compound is heated, vaporized and passed over a copper chromite catalyst at about 300–375° C. under a positive superatmospheric pressure. All of the prior disclosures of related processes of which I am aware either disclose the use of atmospheric pressure during the dehydrogenation reaction or, in certain cases, specifically warn against the use of pressure during the reaction. Indeed, the beneficial effect of the use of pressure in a catalytic dehydrogenation reaction is contrary to the law of Le Chatelier. Thus, the text "The Chemistry of Petroleum Derivatives" by Carleton Ellis (1934) notes the Le Chatelier theorem on pages 104–105 and specifically states that the use of increased pressure will tend to suppress gas formation and retard the rate of dehydrogenation in dehydrogenation reactions. This teaching apparently is endorsed by Dixon in his U.S. patents, U.S. 2,474,781, U.S. 2,747,782 and U.S. 2,580,221 which relate to the dehydrogenation of piperazine to pyrazine. Dixon discloses in each of these patents that, when considering the use of a diluent with the piperazine feed, increasing the partial pressure of piperazine causes the conversion and yield to ammonia to increase and the conversion and yield to pyrazine to fall off markedly. (See Dixon's U.S. 2,474,781, column 6, lines 1–14.)

Thus, it is believed to be surprising and unexpected that the use of superatmospheric pressure in the vapor phase catalytic dehydrogenation of a piperazine to the corresponding pyrazine results in a substantial increase in production rate, i.e., weight of pyrazine produced per unit weight of catalyst per unit of time. The beneficial effect is observed as any small amount of pressure is employed and the beneficial effect increases as the pressure is increased up to about 65 p.s.i.g. At pressures in this range, the piperazine and pyrazine compounds are in vapor phase at the temperatures involved, 300–375° C., and up to about 85 percent increase in production rate has been observed when operating under the conditions of the process of the invention.

The pyrazines which are produced by the process of the invention include pyrazine, itself, and the lower alkyl-substituted pyrazines. These pyrazine compounds are the pyrazines corresponding to the piperazine starting material which is dehydrogenated and which can be represented by the formula,

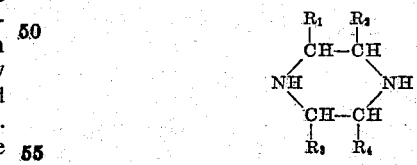

wherein $R_1$, $R_2$, $R_3$ and $R_4$ are hydrogen or methyl or ethyl radicals. Thus, the piperazine compounds which are dehydrogenated include piperazine, 2-methylpiperazine, 2,5-dimethylpiperazine, 2,6-dimethylpiperazine, 2,3,5-trimethylpiperazine, 2,3,5,6-tetramethylpiperazine, 2-ethylpiperazine, 2,6-diethylpiperazine, 2,3,5,6-tetraethylpiperazine, and the like. The pyrazine compounds which are produced include pyrazine, methylpyrazine, 2,5-dimethylpyrazine, 2,6-dimethylpyrazine, 2,3,5-trimethylpyrazine, ethylpyrazine, 2,6-diethylpyrazine, 2,3,5,6-tetramethylpyrazine and 2,3,5,6-tetraethylpyrazine.

The catalyst used in the method of the invention is a copper chromite dehydrogenation catalyst. The copper chromite catalyst contains CuO and $Cr_2O_3$ in a ratio of about 40–85 weight percent CuO and 60–15 weight percent $Cr_2O_3$. A suitable copper chromite catalyst is available commercially from Harshaw Chemical Company and is identified by the supplier as "Cu 0203T ⅛." The Cu 0203 copper chromite catalyst was used in the examples reported herein and it contains about 80 weight percent CuO, 18 weight percent $Cr_2O_3$ and 2 weight percent graphite, the latter being added to aid in the pilling of the catalyst.

The temperature at which the dehydrogenation reaction is carried out is in the range of 300–375° C. The best results have been obtained when the temperature was from 355–365° C.

The pressure in the reaction zone containing the catalyst and piperazine compound vapors is a positive superatmospheric pressure and can range up to about 65 p.s.i.g. Substantial production rate increases are obtained when the pressure is about 5–50 p.s.i.g.

The piperazine compound to be dehydrogenated is heated, initially, so that it is vaporized and can be passed over the catalyst bed either in anhydrous condition or aqueous solutions of the piperazine compound can be vaporized and the resulting mixture of water vapor and piperazine compound vapor passed over the catalyst. Usually the rate at which the piperazine feed is passed over the catalyst will be in the range of up to about 0.8 unit weight per unit weight catalyst per hour.

The terms "conversion" and "yield" used herein are defined as follows. Conversion is a measure of the percent of the feed piperazine reactant that is converted to the pyrazine product and conversion is calculated in accordance with the equation:

$$\text{Percent conversion} = \frac{\text{mols pyrazine product obtained}}{\text{mols piperazine starting material charged}} \times 100$$

Yield is calculated on the basis of the amount of the piperazine reactant actually consumed in the reaction in accordance with the equation:

$$\text{Percent yield} = \frac{\text{mols pyrazine product obtained}}{(\text{mols piperazine charged}) - (\text{mols piperazine recovered})} \times 100$$

The following examples are supplied to illustrate the process of the invention and should not be employed to unduly restrict the invention in view of the disclosure of reactants, catalyst and conditions which has been made herein.

EXAMPLE 1

A series of runs, Nos. 1–20 in Table I, was carried out in which methylpyrazine was produced by dehydrogenating 2-methylpiperazine. Runs 1 through 9 were made by known procedures in which the 2-methylpiperazine was passed over the catalyst bed at atmospheric pressure. Runs 10 through 20 were made using the contribution of this invention in which a positive superatmospheric pressure was maintained in the reaction zone.

Runs 1 through 14 were made in a 1-inch tube reactor which was 10 feet long and which was covered by a heated jacket. Runs 15 through 20 were made in a reactor containing nineteen 10-foot x 1-inch tubes in a heating jacket.

The 2-methylpiperazine feed was prepared as a 75–80 weight percent aqueous solution in all of the runs except runs 11, 13 and 14 in which molten, anhydrous 2-methylpiperazine was vaporized and passed over the catalyst.

In runs 10 through 20 the pressure in the reaction zone was maintained by pumping the feed through the feed vaporizer and preheater into the reactor which was equipped with a back pressure valve on the exit line thereof.

The catalyst used in runs 1 through 20 was the "Cu 0203T ⅛" copper chromate catalyst previously described.

After charging the catalyst to the reactor, the catalyst was reduced before use. The reduction process consisted of passing nitrogen over the catalyst bed while the catalyst bed was heated to 200° C. The heat input to the catalyst bed was then lowered and hydrogen was added to the nitrogen flow. A high temperature spot then developed at the top of the catalyst bed and the temperature rose rapidly to about 300° C. at this zone of high temperature. The heat input was then further reduced and the nitrogen flow increased. This gas mixture of nitrogen and hydrogen was then passed through the reactor while the zone of high temperature traveled down through the entire length of the catalyst bed. Adjustment of the hydrogen flow was made in order to maintain the temperature of the high temperature zone at about 300° C. After the high temperature zone had traveled the length of the catalyst bed, the catalyst bed was heated to a temperature of 300° C. and hydrogen gas was passed over the catalyst to insure reduction of the catalyst.

When the catalyst bed had been reduced, the catalyst bed was then heated to the temperature at which the dehydrogenation of the piperazine starting material was to be carried out, such as about 350° C., the hydrogen flow was stopped and an aqueous solution of the piperazine starting material (or molten piperazine compound) was pumped into the reactor. The condensed effluent from the reactor was collected in samples representing, usually, 8–16 hours of operation. The percent conversion and yield was determined by flash distilling an aliquot of a product sample to separate the volatile materials from the 4–5% higher boiling residues in the crude product. Then, the distillate was analyzed for its piperazine and pyrazine compound content. The pyrazine product was isolated by diluting the reactor effluent with an equal volume of water and the water-pyrazine product azeotrope was distilled. The distillate was then treated with sodium hydroxide in order to layer out the pyrazine product which was then redistilled. Also, the piperazine starting material was separated from the residue of the initial product distillation after excess water was removed by distillation.

The increased production that is obtained by the method of the invention is demonstrated by the data in the two right-hand columns of Table I. The column headed "Production Rate; etc." contains data for each run which was calculated by multiplying the feed rate given in the left column of Table I by the over-all percent conversion and by the molecular weight ratio of 2-methylpiperazine (100) to methylpyrazine (94). The column headed "Production Rate Increase; etc." contains data comparing the production rate for each of runs 10 through 20 made according to the invention with the average production rate for all of runs 1 through 9 carried out at atmospheric pressure. Thus, runs 10 through 20 exhibited an increase in production rate ranging from 14 to 85 percent over the average production rate obtained in runs 1 through 9. Furthermore, the highest production rate obtained at atmospheric pressure was 0.159 in run 5 which is significantly poorer than the lowest production rate obtained when operating under pressure, 0.166 in run 10.

Table I

| Run No. | Feed Rate; Unit Weight 2-MP[1] per unit weight catalyst per hour | Pressure, p.s.i.g. | Temp., °C. | Duration of Run, hours | Over-all Conversion, Percent | Over-all Yield, Percent | Production Rate; Unit weight MPy[2] per unit weight catalyst per hour | Production Rate Increase; Pressure runs compared to average of atmospheric pressure runs; percent increase |
|---|---|---|---|---|---|---|---|---|
| 1  | 0.180 | 0    | 365 | 103.0 | 74.0 | 87.8 | 0.125 | ⎫ |
| 2  | 0.189 | 0    | 365 | 103.0 | 73.0 | 88.5 | 0.130 | ⎪ |
| 3  | 0.232 | 0    | 365 | 63.0  | 71.8 | 87.0 | 0.157 | Average production rate for atmospheric pressure runs equals 0.145. |
| 4  | 0.240 | 0    | 355 | 88.5  | 63.3 | 84.3 | 0.143 | |
| 5  | 0.240 | 0    | 355 | 65.0  | 70.3 | 85.0 | 0.159 | |
| 6  | 0.240 | 0    | 360 | 88.0  | 60.1 | 84.1 | 0.136 | |
| 7  | 0.240 | 0    | 360 | 70.0  | 68.7 | 86.7 | 0.155 | |
| 8  | 0.245 | 0    | 355 | 66.0  | 65.4 | 85.3 | 0.151 | |
| 9  | 0.254 | 0    | 355 | 88.0  | 60.9 | 83.5 | 0.146 | ⎭ |
| 10 | 0.243 | 7.5  | 365 | 103.0 | 72.5 | 87.8 | 0.166 | 14. |
| 11 | 0.320 | 18.5 | 360 | 59.5  | 80.8 | 86.8 | 0.244 | 68. |
| 12 | 0.370 | 18.5 | 365 | 70.5  | 75.7 | 91.2 | 0.264 | 82. |
| 13 | 0.380 | 18.5 | 360 | 54.0  | 75.0 | 85.0 | 0.268 | 85. |
| 14 | 0.390 | 18.5 | 360 | 46.5  | 73.0 | 83.0 | 0.268 | 85. |
| 15 | 0.310 | 23.5 | 363 | 50.8  | 65.9 | 83.3 | 0.192 | 32. |
| 16 | 0.310 | 23.5 | 363 | 100.0 | 67.7 | 86.6 | 0.197 | 36. |
| 17 | 0.320 | 24.5 | 363 | 100.0 | 70.3 | 87.8 | 0.212 | 46. |
| 18 | 0.400 | 36.0 | 363 | 68.0  | 67.2 | 86.0 | 0.253 | 74. |
| 19 | 0.350 | 36.5 | 363 | 92.5  | 65.3 | 85.4 | 0.215 | 48. |
| 20 | 0.350 | 42.0 | 363 | 65.5  | 75.8 | 86.1 | 0.250 | 72. |

[1] 2-Methylpiperazine.
[2] Methylpyrazine.

EXAMPLE 2

A second series of runs was carried out using the apparatus, catalyst and procedure described in Example 1 but employing 2,6-dimethylpiperazine as the starting material and producing 2,6-dimethylpyrazine as the product.

The 2,6-dimethylpiperazine feed in run No. 21 in Table II, below, was prepared as an aqueous solution containing about 48 weight percent 2,6-dimethylpiperazine. The aqueous feed contained 69.5 weight percent 2,6-dimethylpiperazine in run No. 22 and about 70 weight percent 2,6-dimethylpiperazine in run No. 23.

Run No. 21 was carried out at atmospheric pressure and runs 22 and 23 were carried out at superatmospheric pressure in accordance with the invention, the pressure being 7.5 p.s.i.g. in run 22 and 30.0 p.s.i.g. in run 23.

The remarkable improvement that one obtains when using the method of the invention is shown by the data in Table II, below Thus, the production rate in run 22 was almost two times the production rate at atmospheric pressure in run 21 and the production rate in run 23 was almost four times the production rate in run 21.

mospheric pressure in the range of about 5–65 p.s.i.g., said piperazine corresponding to the formula

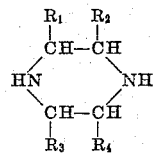

wherein $R_1$, $R_2$, $R_3$ and $R_4$ are members selected from the group consisting of hydrogen, methyl and ethyl radicals.

2. A process according to claim 1 wherein the temperature is about 355–365° C.

3. A process for producing a pyrazine compound, which comprises, heating, vaporizing and passing a piperazine compound over a reduced copper chromite catalyst consisting essentially of about 40–85 weight percent CuO and about 60–15 weight percent $Cr_2O_3$ at a temperature of about 300–375° C. and at a superatmos-

Table II

| Run No. | Feed Rate; Unit weight 2,6-DMP per unit weight catalyst per hour | Pressure, p.s.i.g. | Temp., °C. | Duration of Run, hours | Over-all Conversion, Percent | Over-all Yield, Percent | Production Rate; Unit weight 2,6-DMPy per unit weight catalyst per hour | Production Rate Increase; Pressure runs compared to atmospheric pressure runs; percent increase |
|---|---|---|---|---|---|---|---|---|
| 21 | 0.15 | 0    | 360 | 114 | 77.9 | 85.0 | 0.123 | -------- |
| 22 | 0.24 | 7.5  | 363 | 132 | 95.0 | 95+  | 0.241 | 96 |
| 23 | 0.48 | 30.0 | 365 | 41  | 95.0 | 95+  | 0.481 | 391 |

Vapor phase dehydrogenation of piperazines to pyrazines under positive superatmospheric pressure unquestionably results in truly significant improvement in production. This is contrary to what one would expect when considering Le Chatelier's theorem and the prior art disclosures cited herein, but such an improvement results in substantial savings in a continuous, commercial operation.

I claim:

1. A process for producing a pyrazine compound, which comprises, heating, vaporizing and passing a piperazine compound over a copper chromite catalyst at a temperature of about 300–375° C. and at a superatpheric pressure of about 5–65 p.s.i.g., said piperazine corresponding to the formula

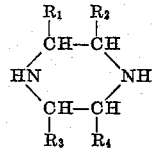

wherein $R_1$, $R_2$, $R_3$ and $R_4$ are members selected from the group consisting of hydrogen, methyl and ethyl radicals.

4. A process according to claim 3 wherein said piperazine and wherein said pyrazine compound is pyrazine.

5. A process according to claim 3 wherein said piperazine compound is 2-methylpiperazine and wherein said pyrazine compound is methylpyrazine.

6. A process according to claim 3 wherein said piperazine compound is 2,6-dimethylpiperazine and said pyrazine compound is 2,6-dimethylpyrazine.

7. A process according to claim 3 wherein said piperazine compound is 2,5-dimethylpiperazine and wherein said pyrazine compound is 2,5-dimethylpyrazine.

8. A process according to claim 3 wherein said piperazine compound is 2,3,5,6-tetramethylpiperazine and wherein said pyrazine compound is 2,3,5,6-teramethylpyrazine.

References Cited in the file of this patent
UNITED STATES PATENTS

| | | |
|---|---|---|
| 2,400,398 | Dixon | Mar. 14, 1946 |
| 2,414,552 | Pfann | Jan. 21, 1947 |
| 2,474,781 | Dixon | June 28, 1949 |
| 2,474,782 | Dixon | June 28, 1949 |
| 2,580,221 | Dixon | Dec. 25, 1951 |